United States Patent [19]

Egawa et al.

[11] 4,450,123
[45] May 22, 1984

[54] PROCESS FOR PRODUCING MICROCAPSULES

[75] Inventors: Setsuya Egawa; Masahiro Sakamoto, both of Kanagawa, Japan

[73] Assignee: Jujo Paper Co., Ltd., Tokyo, Japan

[21] Appl. No.: 392,142

[22] Filed: Jun. 25, 1982

[30] Foreign Application Priority Data

Jul. 17, 1981 [JP] Japan .................. 56-110918

[51] Int. Cl.³ ............................................ B01J 13/02
[52] U.S. Cl. .......................................... 264/4.7; 264/4.3; 427/151; 428/402.21; 428/914; 346/215
[58] Field of Search ..................... 264/4.7; 428/402.21

[56] References Cited

U.S. PATENT DOCUMENTS

| | | | |
|---|---|---|---|
| 3,576,760 | 4/1971 | Gould et al. ............... | 252/1 X |
| 4,105,823 | 8/1978 | Hasler et al. .............. | 264/4.7 X |
| 4,328,119 | 5/1982 | Iwasaki et al. ............ | 264/4.7 |
| 4,356,109 | 10/1982 | Saeki et al. ............... | 428/402.21 X |

FOREIGN PATENT DOCUMENTS 2832637  2/1979  Fed. Rep. of Germany ....... 264/4.7

*Primary Examiner*—Richard D. Lovering

*Attorney, Agent, or Firm*—Koda and Androlia

[57] ABSTRACT

In producing microcapsules using the amino resin as a capsule wall in a system in which hydrophobic core material is dispersed or emulsified in an aqueous acidic solution containing an anionic colloidal substance, said anionic colloidal substance comprises an anionic, water-soluble copolymer consisting of at least three monomers including acrylic acid, hydroxyalkylacrylate or hydroxyalkylmethacrylate and styrenesulfonic acid. The process of the present invention provides a good emulsification against the variation of the emulsifying condition, a good stability of emulsion between the encapsulating reaction, an excellent stability against the variation of the encapsulating conditions and a superior capsule slurry. More desirable results may be obtained when an anionic, water-soluble copolymer which is obtained by copolymerizing one or more components selected from alkyl acrylate, methacrylic acid, alkyl methacrylate, acrylamide, methacrylamide, succinic ester of hydroxyalkyl acrylate, succinic ester of hydroxyalkyl methacrylate, vinyl acetate and acrylonitrile as fourth and further components in addition to the above-mentioned three components, is used.

15 Claims, No Drawings

PROCESS FOR PRODUCING MICROCAPSULES

BACKGROUND OF THE INVENTION

1. Field of the Invention

The present invention relates to a process for producing microcapsules using amino resin, such as melamine-/aldehyde polycondensate and urea/aldehyde polycondensate, as a capsule wall.

2. Prior Art

Microcapsules have been used for changing or controlling various properties of substances in such fields as pharmaceuticals, agricultural chemicals, perfumes, and dyestuffs. The encapsulated methods can be divided into mechanical method, physical method, physicochemical method, chemical method, and methods based upon combinations of these. A variety of properties are exhibited by the capsules prepared by these methods, then they are suitably selected depending upon the core material that is to be encapsulated and its purpose of use. With the mechanical and physical methods, in general, the capsule particles are large, and the impermeability of the wall films is not very high. With the physicochemical and chemical methods, on the other hand, the capsules have small particle size (on the order of microns) which are ideally distributed, and the wall films have a high impermeability.

Microcapsules are principally used for the production of carbonless papers. The microcapsules for carbonless papers are manufactured by the physicochemical or the chemical method.

The physicochemical method can be represented by a coacervation method which usually uses gelatin. This method is capable of encapsulating a wide range of hydrophobic materials, and has been widely employed since it was announced in U.S. Pat. No. 2,800,457 in 2957. The coacervation method utilizes natural materials. With this method, therefore, the quality varies, the capsules have poor water resistance, the concentration of the capsule slurry is not high, and the wall film impermeability is not satisfactory.

With the chemical method, the resin for forming capsule walls is obtained from monomers or oligomers. The chemical method can be divided into an interfacial polymerization method in which the reaction starts from both the core material and the continuous phase, and an in situ polymerization method in which the reaction starts from either the core material or the continuous phase. With these methods, as a wall material, the monomers or oligomers can be selected from a wide range, and as a core materials, from hydrophobic materials through up to hydrophilic materials can be encapsulated. Generally, however, the starting materials have such strong reactivity that they react with the core material and many of the starting materials are toxic. Further, with these methods it is difficult to form thick wall films. Accordingly, the chemical methods have been employed only for particular uses.

The present invention relates to an encapsulating process which pertains to the in situ polymerization method. More specifically, the present invention deals with a process for preparing microcapsules having a wall film composed of a polycondensate of melamine-/aldehyde or urea/aldehyde in a system in which a hydrophobic core material is dispersed or emulsified in an acidic aqueous solution which contains an anionic colloidal material. This anionic colloidal material is an anionic, water-soluble copolymer consisting of three or more monomers which include at least acrylic acid, hydroxyalkyl acrylate or hydroxyalkyl methacrylate, and styrenesulfonic acid.

Use of melamine/formaldehyde polycondensate or urea/formaldehyde polycondensate for forming the wall film has already been disclosed in, for example, Japanese Patent publication Nos. 12380/1962, 3495/1969, and 23165/1972. With these methods, it is difficult to efficiently and stably deposit the polycondensate around the hydrophobic core material, or the emulsification or dispersion is not efficiently performed.

In order to improve the above-mentioned defects, Japanese Patent Publication No. 16949/1979 proposes to use, as the anionic high-molecular material, a polyethylene/maleic anhydride, polyacrylic acid, polymethyl vinyl ether/maleic anhydride, and the like. This method helps improve the emulsification and dispersion properties and the depositing efficiency of the polycondensate around the core material. When the polyethylene/maleic anhydride or the polymethyl vinyl ether/maleic anhydride is employed in this method, however, high temperatures and extended periods of time are required before the copolymer dissolves, and the resulting capsule slurry exhibits an undesirably high viscosity.

Further, Japanese Patent Laid-Open No. 47139/80 teaches to use a copolymer of styrene/maleic anhydride and a copolymer of vinyl acetate/maleic anhydride in combination, to improve the emulsification and dispersion properties, in order to obtain a stable capsule slurry having low viscosity. However, since the copolymer of styrene/maleic anhydride precipitates when the pH is smaller than 4, it cannot use the method which uses the urea/formaldehyde as a capsule wall-forming agent that efficiently reacts at low pH values, or the method in which urea or ethyleneurea is added at a pH of less than 4 in order to remove the unreacted formaldehyde after the capsules have been formed.

According to Japanese Patent Laid-Open No. 51238/81 which produces capsules having a wall film composed of melamine/formaldehyde polycondensate, a polymer of the type of vinylbenzenesulfonic acid is used as the anionic high-molecular material, to obtain a high-concentration, low-viscosity capsule slurry which permits the unreacted formaldehyde to be processed at low pH values. When this method is adapted to the preparation of capsules having wall film of urea/formaldehyde resin, however, it is difficult to obtain a dense capsule wall, and the whole system often coagulates when the encapsulating conditions are changed even slightly. Further, a large quantity of foam is produced when the polymer dissolves which makes it difficult to prepare capsules maintaining good operability and stability.

SUMMARY OF THE INVENTION

In producing microcapsules using the amino resin as a capsule wal material, i.e. melamine/aldehyde polyconde and urea/aldehyde polycondensate, the objects of the present invention are as follows.

It is a first object of the present invention to provide a process for producing microcapsules, in which the hydrophobic core material is emulsified quickly, the emulsified particles have a good distribution, and the emulsified particles are so controlled as to remain stable under the temperature, time, pH value and concentration of the encapsulating reaction conditions.

It is a second object of the present invention to provide a process for producing microcapsules which, under the variation of the encapsulating conditions such as the materials used, temperature, time, pH value, concentration, and the like, form stably a capsule wall having properties to meet the purpose, such as impermeability, softness and rigidity.

A third object of the invention is to provide a process for producing microcapsules, in which a high-concentration, low-viscosity capsule slurry with a good stability against aging and which can be efficiently coated.

The above-mentioned objects can be accomplished by using, as the anionic colloidal substance, an anionic, water-soluble copolymer consisting of at least three monomers including acrylic acid, hydroxyalkyl acrylate or hydroxyalkyl methacrylate, and styrenesulfonic acid, dissolved in a hydrophilic medium in which a hydrophobic core material that is to be formed into capsules has been emulsified and dispersed. More desirable results will be obtained if an anionic, water-soluble copolymer which is obtained by copolymerizing one or more components selected from alkyl acrylate, methacrylic acid, alkyl methacrylate, acrylamide, methacrylamide, succinic ester of hydroxyalkyl acrylate, succinic ester of hydroxyalkyl methacrylate, vinyl acetate and acrylonitrile, as fourth and further components in addition to the above-mentioned three components, is used.

DETAILED DESCRIPTION OF THE INVENTION

The composition of the anionic colloidal material which is effective for the present invention consists of 10 to 95% by weight of acrylic acid, 2 to 50% by weight of styrenesulfonic acid, 2 to 30% by weight of hydroxyalkyl acrylate or hydroxyalkyl methacrylate, and 0 to 20% by weight of the fourth or further components. More preferably, the composition consists of 50 to 80% by weight of acrylic acid, 5 to 30% by weight of styrenesulfonic acid, 5 to 20% by weight of hydroxyalkyl acrylate or hydroxyalkyl methacrylate, and 1 to 15% by weight of fourth and further components.

The copolymeric water-soluble material can be used salt-free or partly in the form of salt. Preferred examples of the salt include sodium salt, potassium salt and lithium salt. Although details of the functions of the monomers are not clear, the acrylic acid promotes the emulsification, increases the stability of emulsified particles (hereinafter referred to as emulsion stability) when the capsule walls are being formed, promotes the reaction for forming capsule walls, and offers a capsule slurry which coagulates less. In this case, however, large particles are still dispersed, and the capsule slurry exhibits a relatively high viscosity. The capsule film is impermeable but relatively soft. The styrenesulfonic acid works to quicken the rate of emulsification, to quicken the rate of reaction for forming capsule walls, and makes relatively hard capsule walls. In this case, however, the capsules coagulate with each other during the reaction in which the capsule wall is being formed, which makes it difficult to stably maintain the system during the reaction. Further, the capsule film lacks impermeability. At present, furthermore, the manufacturing cost is high and it is not advantageous to use the styrene sulfonic acid in large amounts. When the hydroxyalkyl methacrylate or hydroxyalkyl acrylate is used, the reaction for forming capsule walls is promoted, and a capsule slurry which coagulates less and which has a relatively small viscosity is provided. In this case, however, the emulsifying ability is slightly deteriorated. Examples of the hydroxyalkyl group include those having 1 to 10 carbon atoms, and particularly those having 1 to 4 carbon atoms. Particular examples include hydroxymethyl acrylate, hydroxyethyl acrylate, hydroxybutyl acrylate, hydroxyisopropyl acrylate, hydroxymethyl methacrylate, hydroxyethyl methacrylate, hydroxybutyl methacrylate and hydroxyisopropyl methacrylate.

As mentioned above, the effects of the anionic, water-soluble copolymer of the present invention stem from total balance of the effects of carboxyl group (—COOH) of acrylic acid, sulfone group (—SO$_3$X, wherein X denotes hydrogen atom, alkali metal or ammonia) of styrenesulfonic acid, and hydroxyl group (—OH) of hydroxyalkyl acrylate or hydroxyalkyl methacrylate, which form the copolymer, and of the effects of hydrophobic groups such as a styryl group, alkyl group, and the like.

When it is necessary to further control the capsules according to the characteristics of the whole system, there can be used, as fourth and succeeding components, succinic ester of hydroxyalkyl methacrylate for promoting the rate of forming capsule walls, and alkyl acrylate or alkyl methacrylate, as well as acrylamide, methacrylamide and acrylonitrile, etc., for adjusting the particle distribution of emulsified particles, for adjusting the viscosity of capsule slurry, and for adjusting the impermeability, softness and rigidity of capsule walls.

The anionic, water-soluble high-molecular copolymer of the present invention should, in practice, be handled as an aqueous solution which usually contains 20% by weight of non-volatile components and which has a pH of 1 to 4. In the solution containing 20% by weight of non-volatile components, its viscosity will usually range from 100 to 500,000 cps when it is measured at 25° C. by using a Brookfield viscometer. Preferably, the viscosity should range from 500 to 20,000 cps. With the viscosity smaller than 500 cps, the emulsifying ability is not sufficient, and the ability to protect the emulsified particles is not sufficient during the reaction for forming capsule walls. With the viscosity greater than 20,000 cps, on the other hand, the emulsifying ability is excellent, and the ability to protect the emulsified particles is excellent during the reaction for forming capsule walls. In this case, however, the solution requires a clumsy handling operation, and the viscosity of the capsule slurry obtained from it is too high. This, however, does not apply when the above-mentioned factors do not play important roles.

The anionic, water-soluble high molecular copolymer of the present invention can be used as such or be diluted as required. The copolymer of the present invention remains stable no matter how it is diluted, and does not become turbid, precipitate or coagulate over a pH range of 1 to 14 of the aqueous solution. Therefore, a variety of processes can be adapted as a process for forming capsule walls and for reducing free formaldehyde and as the after-treatment. For instance, when the processing with free formaldehyde is carried out by adding urea or ethyleneurea, the pH value can be selected at 2 to 3.

Examples of the urea/aldehyde polycondensate or melamine/aldehyde polycondensate that is used as a wall-forming substance in the present invention include urea/aldehyde polycondensate, methyl- or dimethylolurea or methyl-dimethylolurea/aldehyde polycondensate, melamine/aldehyde polycondensate, melamine/aldehyde polycondensate, methylated or butylated melamine/aldehyde polycondensate, and melamine/aldehyde polycondensate modified with phenols, benzoguanamine or urea. Good capsules can be obtained no matter which wall-forming substances are used, since the reaction for forming capsule walls can be performed over a wide range of pH values by using the anionic, water-soluble copolymer of the present invention. Examples of the aldehyde include not only formaldehyde but also acetaldehyde, butyraldehyde, glyoxal, glutaraldehyde, acrolein, benzaldehyde, and the like. From the reaction rate, reaction temperature, time and cost, however, it is most desirable to use urea and formaldehyde when the process is to be carried out industrially.

In the system for producing capsules, the anionic, water-soluble copolymer is used in an amount of 1 to 15 parts by weight per 10 parts by weight (parts are all by weight hereinafter) of the capsule forming material, and is preferably used in an amount of 3 to 10 parts. The amount, however, may differ depending upon the kind of anionic, water-soluble copolymer, the starting material for forming the capsule walls, the kind of core material, and the capsule forming conditions (temperature, pH value, concentration), and the like. Further, it is allowable to use the anionic, water-soluble high-molecular copolymer of the present invention in combination with anionic, water-soluble high-molecular materials such as ethylene/maleic anhydride copolymer, methyl vinyl ether/maleic anhydride copolymer, ethyl vinyl ether/maleic anhydride copolymer, polyacrylic acid, propylene/maleic anhydride copolymer, isobutylene/maleic anhydride copolymer, butadiene/maleic anhydride copolymer, vinyl acetate/maleic anhydride copolymer, modified polyvinyl alcohol, cellulose derivatives, and gum arabic.

In recent years, the microcapsules have been used in such applications as recording materials, pharmaceuticals, perfumes, agricultural chemicals, chemical products, foods, solvents, catalysts and enzymes. Examples of the core material also include dyestuffs, dye precursors, liquid crystals, pigments such as carbon black, aspirin, carcinostatic agents, menthol, wines, gasoline, dibutyl phthalate, enzyme lipase, and the like. These materials are encapsulated either as such or in a dispersion or emulsion in a hydrophobic liquid. In particular, microcapsules are used the most for carbonless papers that are used as recording materials among other applications.

A high-concentration, low-viscosity capsule slurry which does not coagulate can be obtained if the present invention is used for the production of microcapsules for carbonless papers. Further, the capsule wall has good impermeability to satisfy the requirement. The capsule wall which satisfies the requirement referred to here means that it exhibits the most desirable color-developing and smudging characteristics in response to various elements that are related to properties of the carbonless paper, such as thickness, rigidity, size, and surface coarseness of the base paper, kinds of adhesives and stilt materials used for applying the capsules and the structure of a layer coated by the various coater. In general, soft capsule walls exhibit a resistance against small pressure; i.e., fewer capsules are completely destroyed. With hard capsule walls, the capsules are completely destroyed even with the application of small pressure, provided the force greater than a predetermined value is locally exerted; i.e., all of the core material is released.

Below are briefly mentioned the encapsulating steps when the present invention is adapted to the manufacture of microcapsules for carbonless papers.

(1) Colorless dye for carbonless papers is dissolved in a hydrophobic solution:

The hydrophobic solution should be a highly aromatic, high boiling solvent having low polarity. Examples include partially hydrogenated terphenyl, diarylalkane, alkyl- naphthalene, alkylbiphenyl, diphenyl ether, chlorinated paraffin, and the like. Examples of the auxiliary solvent include paraffin, alkylbenzene, olefins, and the like. Further, high-boiling polyhydric alcohol, high-boiling ketones, plant oils and modified plant oils are often used. They, however, are used in small amounts for specific purposes. Examples of the colorless dyestuff practically used for the carbonless papers include triphenylmethane/phthalide, fluorane, phenothiazine, indolylphthalide, leuco Auramine, spiropyran triphenylmethane, azaphthalide, chromenoindole, and triazene types. Representative examples may be Crystal Violet Lactone (CVL) of the triphenylmethane/phthalide type, Benzoyl Leuco Methylene Blue (BLMB) of the phenothazine type, and diethylaminomethylanilinofluorane of the fluorane type. 1 to 8% by weight of one or more of these colorless dyestuffs are dissolved in a solvent or in a mixture of several solvents heated to 90° to 120° C. After being dissolved, the mixture is cooled to room temperature (about 25° C.)

(2) Preparation of an aqueous solution containing the anionic colloidal substance:

The present invention uses an anionic, water-soluble copolymer composed of three monomers of acrylic acid, hydroxyalkyl methacrylate or hydroxyalkyl acrylate, and styrenesulfonic acid, or uses an anionic, water-soluble copolymer obtained by copolymerizing, in addition to the above-mentioned three monomers, one or more components selected from alkyl acrylate, methacrylic acid, alkyl methacrylate, acrylamide methacrylamide, succinic ester of hydroxyalkyl acrylate, succinic ester of hydroxyalkyl methacrylate, vinyl acetate, and acrylonitrile, as fourth and succeeding components. The aqueous solution can be diluted with city water to a desired concentration. Commercially available emulsifying/dispersing agents such as polyethylene/maleic acid, polystyrene/maleic acid, polyvinyl alcohol, polystyrenesulfonic acid, and the like must be heated and dissolved and then be cooled before they are used for the present invention. In this regard, the copolymer of the present invention is effective for reducing the production time and saving energy. 2 to 10 parts of the polymer of the present invention are used per 100 parts of the core material. The pH value of the solution lies from 2 to 4 though it varies slightly depending upon the kinds and ratios of the monomers which form the polymer of the present invention. The pH is not adjusted during this stage. For instance, the polymer which consists of 69 parts of acrylic acid, 15 parts of hydroxyethyl methacrylate, 10 parts of styrenesulfonic acid, and 6 parts of succinic ester of hydroxyethyl methacrylate, exhibits a pH of 3.6 at 25° C. when it is measured in the form of 5% aqueous solution, and the polymer which consists of 60 parts of acrylic acid, 15 parts of hydroxyethyl methacrylate and 25 parts of styrenesulfonic acid exhibits a pH of 2.0 at 25° C. when it is measured in the form of 5% aqueous solution.

(3) Dissolution of a material which forms capsule walls:

When, for example, a urea/formaldehyde which is the cheapest material for forming wall films and which requires the most severe pH conditions is used, urea and a polyhydric phenol such as resorcinol are dissolved in the aqueous solution prepared in (2) to adjust the pH to 2.5 to 5.5.

(4) Emulsification of colorless dyestuff solution:

The solution of colorless dye prepared in (1) above is dispersed and emulsified in an aqeuous solution prepared in (3) above. The size and distribution of emulsified particles play important roles for the capsules for carbonless papers. To obtain a good distribution, the particles should be sufficiently uniformly dispersed with weak stirring prior to initiating the emulsification step. The pre-mixed solution will then be introduced into an emulsifying machine. Here, selection of the emulsifying machine plays an important role. Generally, a homogenizing mixer, homogenizer, flow-jet mixer, or in-line mill will be used. There are also available a device in which the solution is injected through nozzles, and a so-called static mixer. Here, it is desirable to use the static mixer that was previously proposed in Japanese Patent Application No. 160756/1980. The average particle diameter of capsules for carbonless paper usually ranges from 4 to 5 microns. Here, more than 90% of the particles should be within 1 to 8 microns. The emulsifying liquid should be maintained at a room temperature from the standpoint of particle-size distribution, emulsion stability, and easy handling operation. When the anionic, water-soluble high-molecular copolymer of the present invention is used, there is no particular limitation to the pH of the emulsion. By taking the reaction for forming capsule walls into consideration, however, the pH should be adjusted to 2 to 4. The anionic, water-soluble copolymer of the present invention remains stable over a wide pH range, and exhibits particularly excellent dissolution stability, strong emulsifying ability, and stability of the emulsified particles when the pH is smaller than 4.

(5) Reaction for forming capsule walls:

Afte the emulsified particles of predetermined particle diameters are obtained in (4), the pH of the solution is adjusted to be smaller than 3.5. The smaller the pH of the solution, the greater the reaction rate and the higher the impermeability of the film. If the reaction is too fast, however, it prevents the formation of uniform capsule walls. Further, by taking into consideration the materials in the reaction equipment, the pH should be adjusted to about 3.4. The temperature in the system should be raised while adding formaldehyde or after having added formaldehyde. Formaldehyde is used in an amount of 0.6 to 5.0 moles and, preferably, 1.2 to 3.0 moles per mole of urea. From the standpoint of the productivity, the temperature should be raised as quickly as possible. From the homogeneity of the reaction, however, the reaction temperature should be raised at a suitable rate depending upon the reaction vessel and the amount of reacting solution. The temperature will be raised to 35° to 90° C. Usually, however, the temperature is adjusted to 50° to 75° C. After a set temperature is reached, the temperature should be maintained for more than a predetermined period of time. If the temperature is set at 55° C., that temperature should be maintained for at least one hour.

(6) Treatment for reducing the unreacted formaldehyde:

The formaldehyde which is used in excess amounts for the urea and polyhydric phenol remains in the capsule slurry even after the reaction for forming capsule walls is finished. The unreacted formaldehyde can be reduced by a chemical method by using one or a combination of compounds having active hydrogen, such as ammonia, urea, sulfite, hydrogensulfite, ethyleneurea, hydroxylamine salt, and methyl acetoacetate, and by using various carbonates in combination therewith, or by a physical method such as steam distillation or ultrafiltration. Although any method may be employed, the simplest method is to adjust the pH value to 7.5 using 28% ammonium hydroxide solution. Thus, the unreacted formaldehyde is removed, and all of the steps are finished.

Particular examples of the invention will be described below by way of working examples. The invention, however, is in no way limited to these examples only.

EXAMPLE 1

30 parts of an anionic, water-soluble copolymer consisting of 70 parts of acrylic acid, 15 parts of styrenesulfonic acid, and 15 parts of hydroxyethyl methacrylate, and having 20.0% of non-volatile components and a viscosity of 2,500 cps (measured at 25° C. using a Brookfield viscometer), was mixed with 115 parts of deionized water under stirring, and diluted. Further, 10 parts of urea and 1.4 parts of resorcinol were dispersed and dissolved. These compounds need not be heated, but need to be mildly stirred to form a uniform mixture aqueous solution. The pH was 2.6. An aqueous solution containing 10% of caustic soda was added dropwise with care so that the pH was 3.4. Separately, a high-boiling solvent composed chiefly of phenylxylylethane (Hisol SAS, a product of Nisseki Kagaku Co.) and a high-boiling solvent composed chiefly of diisopropyl-naphthalene (KMC-113, a product of Kureha Kagaku Co.) were mixed at a ration of 1:1. To 170 parts of this mixture solvent 5.4 parts of Crystal Violet Lactone and 1.3 parts of Benzoyl Leucomethylene Blue were added and dissolved under stirring while heated to about 90° C. After being dissolved, the mixture was cooled to ordinary temperature and was carefully mixed into an aqueous solution containing the above-prepared anionic, water-soluble copolymeric mixture while paying attention to the phase inversion. The mixture was then mixed using a homomixer (manufactured by Tokushu Kiki Co.) at 9,000 rpm. After 2 minutes, particles having an average particle diameter of 4.9 microns were obtained. Thereafter, 26 parts of an aqueous solution containing 37% formaldehyde was added, and the mixture was heated until the temperature reached 55° C. The reaction for forming capsule walls was then continued for 2 hours. The capsule slurry was introduced in small amounts into the aqueous solution of resorcinol, and shaken to observe the degree of capsule wall formation. No change was recognized (the capsule wall immediately exhibits a bluish color in case its degree of formation is insufficient), so an impermeable wall film had been formed. In order to reduce the amount of residual formaldehyde, the mixture was cooled to 40° C., and 28% ammonia water was added until the pH was 7.5 to thereby obtain capsule slurry for carbonless papers.

EXAMPLES 2 TO 9

Capsule slurries were prepared by the same procedure as in Example 1 using eight anionic, water-soluble copolymers consisting of acrylic acid, styrenesulfonic acid and hydroxyethyl methacrylate at different ratios.

EXAMPLES 10 TO 12

Capsule slurries were prepared by the same procedure as in Example 1 using three anionic, water-soluble copolymers consisting of acrylic acid, styrenesulfonic acid and hydroxyethyl methacrylate at different ratios from acrylic acid and hydroxyethyl methacrylate.

EXAMPLES 13 TO 17

Capsule slurries were prepared by the same procedure as in Example 1 using anionic, water-soluble copolymers consisting of 70 parts of acrylic acid, 15 parts of styrenesulfonic acid, and 15 parts of hydroxymethyl methacrylate, hydroxybutyl methacrylate, hydroxyisobutyl methacrylate, hydroxy-tert-butyl methacrylate or hydroxyethylhexyl methacrylate. Table 1 shows test results of these hydroxyalkyl methacrylates. Nearly the same results were obtained when the hydroxyalkyl methacrylates were replaced by hydroxyalkyl acrylates.

EXAMPLES 18 TO 21

Capsules slurries were prepared by the same procedure as in Example 1 using anionic, water-soluble copolymers consisting of 70 parts of acrylic acid, 15 parts of styrenesulfonic acid, 10 parts of hydroxyethyl methacrylate, and 5 parts of a fourth component selected from methyl acrylate, ethyl acrylate, butyl acrylate and succinic ester of hydroxyethyl methacrylate.

EXAMPLE 22 TO 24

Capsule slurries were prepared by the same procedure as in Example 1 using anionic, water-soluble copolymers consisting of 70 parts of acrylic acid, 10 parts of styrenesulfonic acid, 10 parts of hydroxyethyl methacrylate, 5 parts of a fourth component consisting of methyl methacrylate, and 5 parts of a fifth component consisting of vinyl acetate, acrylamide or acrylonitrile.

EXAMPLE 25

A capsule slurry was prepared by the same procedure as in Example 22 using vinyl acetate as a fifth component, but adjusting the pH from 3.4 to 3.7 prior to starting the emulsification.

EXAMPLE 26

30 parts of urea was dissolved in deionized water to prepare 300 parts of the solution, to which was added 90 parts of an aqueous solution containing 40% of glyoxal. After the pH value was adjusted to 8, the mixture was heated to 80° to 90° C. for 5 hours to effect the reaction. An aqueous solution of water-soluble urea/glyoxal precondensate was obtained. On the other hand, an anionic, water-soluble copolymer consisting of 70 parts of acrylic acid, 13 parts of styrenesulfonic acid, 10 parts of hydroxyethyl methacrylate and 7 parts of ethyl methacrylate, and having 20.5% of nonvolatile components and a viscosity of 1,800 cps (measured at 25° C. using a Brookfield viscometer), was prepared. 30 parts of this copolymer was dissolved in 130 parts of the above-mentioned aqueous solution under stirring. 1.4 parts of resorcinol was dispersed and dissolved in this aqueous solution, 150 parts of a hydrophobic solution containing the same dye precursor as that of Example 1 was slowly added under stirring, and the mixture was emulsified using a homomixer at 9,000 rpm for 2 minutes. Emulsified particles having an average particle diameter of 3.5 microns with good distribution were obtained. The solution was mixed with 8 parts of a solution containing 37% of formaldehyde, its pH was adjusted to 3.7 using formic acid, and the reaction was carried out at 60° C. for 2 hours. The pH value was then adjusted to 7.5 using 28% ammonia water, to complete the process for forming capsules.

EXAMPLE 27

30 parts of a water-soluble copolymer consisting of 70 parts of acrylic acid, 13 parts of styrenesulfonic acid, 10 parts of hydroxyethyl methacrylate and 7 parts of vinyl acetate was dissolved and diluted in 115 parts of deionized water, to which was further added 160 parts of a hydrophobic core material obtained by dissolving 15 parts of diethylaminomethylanilinofluorane and 3 parts of Crystal Violet Lactone in 300 parts of phenylxylylethane at 110° C. The mixture was then emulsified using a homomixer at 9,000 rpm for 2 minutes to obtain emulsified particles having an average particle size of 3.3 microns. 30 parts of 80% methylated methylolmelamine (Rezmine 714, a product of Monsanto Co.) was dissolved in this solution, and its pH value was immediately adjusted to 4.5 using a 10% aqueous caustic soda solution. The solution was heated to 50° C., and the reaction was terminated after 2 hours. Thereafter, the pH was adjusted to 7.5 with 28% ammonia water to finish the process for preparing capsules.

COMPARATIVE EXAMPLES 1 TO 4

Capsule slurries were prepared by the same procedure as in Example 1 but using anionic, water-soluble copolymers consisting of two components selected from acrylic acid, styrenesulfonic acid and hydroxyethyl methacrylate.

COMPARATIVE EXAMPLES 5 AND 6

Capsule slurries were prepared in the same manner as in Example 1 but using polyacrylic acid and ethylene/maleic anhydride copolymer, respectively, instead of the anionic, water-soluble copolymer of Example 1.

COMPARATIVE EXAMPLE 7

For comparison with Example 25, a capsule slurry was prepared in quite the same manner as in Comparative Example 6 employing ethylene/maleic anhydride copolymer, but adjusting the pH from 3.4 to 3.7 prior to effecting the emulsification.

The viscosities, emulsifying ability (averge particle diameters), emulsion stability (width of particle size distribution), film softness, and film impermeability of the microcapsule slurries obtained in the aforementioned Examples and Comparative Examples were measured in accordance with the following methods. These results are shown in Tables 1 to 3.

(1) Viscosity: Viscosity of the capsule slurry was measured at 25° C. using a Brookfield Viscometer.

(2) Emulsifying ability: Indicated in terms of average particle diameter of the capsules, i.e., in terms of particle diameter at a point of 50% volume, as measured using a particle-size measuring device, Coulter Counter Model TA-II (manufactured by Coulter Electronics Co., U.S.A.).

(3) Emulsion stability: Difference in particle size between a point of 25% volume and a point of 75% volume as measured by the particle-size measuring device, Coulter Counter Model TA-II, was indicated as a width of particle size distribution. Those having good emulsion stability has a small distribution width.

(4) Film softness: 4.5 g/m² of a coating liquid obtained by mixing and dispersing 180 parts of capsule slurry, 35 parts of wheat starch, 85 parts of a solution containing 8% of corn starch, and 340 parts of water was applied onto paper (40 g/m²) using a wire bar, and was dried to obtain an upper sheet. The upper sheet placed on a lower sheet (W-50 BR produced by Jujo Paper Mill). A static pressure of 20 kg/cm² was applied. After one hour, the reflectance of the color image on the lower sheet was measured using a Hunter whiteness meter, to find the difference relative to the reflectance on the lower sheet before the test. The smaller the difference, the better the softness of the capsule film. In practice, the difference should be smaller than 10 points.

(5) Wall film impermeability: The same upper sheet used for testing the wall film softness was prepared, left to stand in an oven heated at 105° C. for 24 hours, placed on a lower sheet (W-50 BR produced by Jujo Paper Mill), and passed through a calender which exerted a line pressure of 15 kg/cm² to develop color. After one hour, the reflectance of the color image was measured using the Hunter whiteness meter. The difference between the above reflectance and the reflectance of the color image developed on the upper sheet by a calender, which was not left to stand in the oven, was determined. The wall film impermeability is indicated in terms of the degree of deterioration by heat. The smaller the difference, the better the impermeability of the wall film and thus the preservability. In practice, the difference should be smaller than 5 points.

As will be obvious from Tables 1 to 3, the capsule slurries according to the embodiments of the present invention have viscosities that lie from 100 to 650 cps, and exhibits very good properties such as emulsifying ability, emulsion stability, and softness and impermeability in the capsule walls. In the Comparative Examples, on the other hand, the capsule slurries have high viscosities, insufficient emulsifying ability, invite coagulation during the capsule forming process, and have problems with the softness and impermeability of the wall films.

TABLE 1

Test results of Examples

| Example No. | Copolymer composition (% by weight) | | | Slurry viscosity (25° C.) | Emulsifying ability (average particle diameter) |
|---|---|---|---|---|---|
| | acrylic acid | styrenesulfonic acid | hydroxyalkyl methacrylate | | |
| 1 | 70 | 15 | (hydroxyethyl methacrylate) 15 | 250$^{cps}$ | 5.0$^{\mu}$ |
| 2 | 70 | 17.5 | 12.5 | 320 | 4.7 |
| 3 | 70 | 20 | 10 | 300 | 4.2 |
| 4 | 70 | 25 | (hydroxyethyl methacrylate) 5 | 500 | 3.8 |
| 5 | 60 | 25 | 15 | 280 | 4.0 |
| 6 | 50 | 25 | 25 | 120 | 4.1 |
| 7 | 40 | 25 | 35 | 130 | 4.2 |
| 8 | 30 | 25 | 45 | 170 | 4.1 |
| 9 | 20 | 25 | 55 | 230 | 3.9 |
| 10 | 75 | 15 | (hydroxyethyl methacrylate) 10 | 390 | 4.9 |
| 11 | 77.7 | 12.5 | 10 | 430 | 5.2 |
| 12 | 80 | 10 | 10 | 450 | 5.6 |
| 13 | 70 | 15 | (hydroxymethyl methacrylate) 15 | 340$^{cps}$ | 5.2 |
| 14 | 70 | 15 | (hydroxybutyl methacrylate) 15 | 470 | 6.0 |
| 15 | 70 | 15 | (hydroxyisobutyl methacrylate) 15 | 560 | 6.3 |
| 16 | 70 | 15 | (hydroxy-tert-butyl methacrylate) 15 | 630 | 6.0 |
| 17 | 70 | 15 | (hydroxyethylhexyl methacrylate) 15 | 390 | 5.5 |

| Example No. | Emulsion stability (width of distribution) | Film softness (color development under static pressure of 20 kg/cm²) | Film impermeability at 105° C. (deterioration by heat after 24 hrs.) | Notes |
|---|---|---|---|---|
| 1 | 3.2$^{\mu}$ | 7.5$^{points}$ | 2.9$^{points}$ | Increase of styrene- |
| 2 | 2.8 | 6.7 | 3.0 | sulfonic acid improves |
| 3 | 2.5 | 6.2 | 3.4 | emulsification, but slightly reduces the film impermeability. |
| 4 | 2.3 | 5.6 | 3.5 | Decrease of acrylic acid |
| 5 | 2.5 | 5.2 | 3.8 | and increase of hydro- |
| 6 | 2.8 | 4.7 | 4.0 | xyethyl methacrylate |
| 7 | 3.1 | 4.9 | 4.2 | improves film softness, |
| 8 | 3.5 | 4.7 | 4.5 | but slightly reduces |
| 9 | 4.0 | 4.1 | 4.9 | emulsion stability and film impermeability. |
| 10 | 3.3 | 7.3 | 2.8 | Increase of acrylic acid |
| 11 | 3.5 | 7.6 | 2.5 | and decrease of styrene- |

TABLE 1-continued

| | | | | |
|---|---|---|---|---|
| 12 | 3.8 | 8.0 | 2.6 | sulfonic acid slightly reduce the emulsion stability, but present no essential change. |
| 13 | 3.5 | 7.5 | 3.4 | Varied alkyl group in hydroxyalkyl meth- acrylate slightly alters emulsifying ability and emulsion stability, but exhibits practically excellent results. |
| 14 | 4.3 | 8.5 | 3.0 | |
| 15 | 4.2 | 8.7 | 3.2 | |
| 16 | 4.5 | 8.4 | 2.9 | |
| 17 | 3.9 | 8.4 | 2.9 | |

TABLE 2

Test Results of Examples

| Example No. | Copolymer composition (% by weight) | | | | | Slurry viscosity (25° C.) | Emulsifying ability (average particle diameter) |
|---|---|---|---|---|---|---|---|
| | acrylic acid | styrenesul- fonic acid | hydroxyethyl methacrylate | fourth component | fifth component | | |
| 18 | 70 | 15 | 10 | 5 (methyl- acrylate) | — | 350$^{cps}$ | 4.0$^\mu$ |
| 19 | 70 | 15 | 10 | 5 (ethyl acrylate) | — | 380 | 4.1 |
| 20 | 70 | 15 | 10 | 5 (butyl acrylate) | — | 420 | 4.3 |
| 21 | 70 | 15 | 10 | 5 (succinic ester of hydroxy- ethyl me- thacrylate) | — | 600 | 4.8 |
| 22 | 70 | 10 | 10 | 5 (methyl methacry- late) | 5 (vinyl acetate) | 150 | 3.7 |
| 23 | 70 | 10 | 10 | 5 (methyl- methacry- late) | 5 (acryl- amide) | 450$^{cps}$ | 3.8$^\mu$ |
| 24 | 70 | 10 | 10 | 5 | 5 (acrylo- nitrile) | 310 | 3.9 |
| 25 | 70 | 10 | 10 | 5 (ethyl methacry- late) | 5 (vinyl acetate) | 260 | 3.8 |
| 26 | 70 | 13 | 10 | 7 (vinyl acetate) | — | 430 | 3.7 |
| 27 | 70 | 13 | 10 | 7 | — | 640 | 3.5 |

| Example No. | Emulsion stability (width of distri- bution) | Film softness (color development under static pres- sure of 20 kg/cm$^2$) | Film impermeability at 105° C. (deterio- ration by heat after 24 hrs.) | Notes |
|---|---|---|---|---|
| 18 | 2.3$^\mu$ | 4.2$^{points}$ | 2.3$^{points}$ | Addition of fourth compo- nent improves emulsion stability, film softness and film imper- meability. |
| 19 | 2.2 | 4.3 | 2.5 | |
| 20 | 2.5 | 4.5 | 2.0 | |
| 21 | 3.0 | 5.0 | 2.1 | |
| 22 | 2.0 | 3.8 | 1.4 | Addition of the fifth component further improves film impermeability. |
| 23 | 2.1 | 4.0 | 2.0 | |
| 24 | 2.3 | 4.2 | 1.9 | |
| 25 | 1.9 | 5.6 | 2.7 | When pH-value of emulsifier is adjusted to 3.7, film impermeability reduces, but there is practically no trouble. |
| 26 | 2.8 | 7.4 | 4.8 | Urea/glyoxal |

TABLE 2-continued

| 27 | 3.5 | 4.9 | 3.1 | precondensate or melamine/formaldehyde precondensate as film material forms excellent capsules. |

TABLE 3

Test Results of Examples

| Comparative Example No. | Copolymer composition (% by weight) | | | Slurry viscosity (25° C.) | Emulsifying ability average particle diameter |
| --- | --- | --- | --- | --- | --- |
| | acrylic acid | styrenesulfonic acid | hydroxyethyl methacrylate | | |
| 1 | 80 | 20 | — | 1230 cps | 4.7µ |
| 2 | 80 | — | 20 | 1170 | 6.7 |
| 3 | — | 80 | 20 | — | — |
| 4 | — | 20 | 80 | — | — |
| 5 | (polyacrylic acid 100) | | | 3000 | 5.4 |
| 6 | (ethylene/maleic anhydride copolymer 100) | | | 1000 | 5.2 |
| 7 | (ethylene/maleic anhydride copolymer 100) | | | 1200 | 5.2 |

| Reference Example No. | Emulsion stability (width of distribution) | Film softness (color development under static pressure of 20 kg/cm) points | Film impermeability at 105° C. (deterioration by heat after 24 hrs.) points | Notes |
| --- | --- | --- | --- | --- |
| 1 | 4.9 | 10.2 | 4.8 | Slurry viscosity is high, film softness is insufficient and emulsion stability is poor. Capsule forming is impossible due to coagulation. |
| 2 | 7.3 | 17.0 | 6.2 | |
| 3 | — | — | — | |
| 4 | — | — | — | |
| 5 | 5.6 | 13.2 | 3.2 | Slurry viscosity is high, film softness or film impermeability is insufficient. In case of ethylene/maleic anhydride copolymer, when pH-value before emulsification is adjusted to 3.7, capsule quality deteriorates and accordingly the condition for capsule formation is severed. |
| 6 | 3.2 | 8.4 | 4.5 | |
| 7 | 3.4 | 9.5 | 7.2 | |

We claim:

1. Process for producing microcapsules which use an amino resin as a capsule-wall in a system in which hydrophobic core material is dispersed in an aqueous acidic solution containing an anionic colloidal substance, wherein said anionic colloidal substance comprises an anionic, water-soluble copolymer consisting of at least three monomers including acrylic acid, hydroxyalkylacrylate or hydroxyalkylmethacrylate and styrene-sulfonic acid and said anionic, water-soluble copolymer is used in amount of 2 to 10 parts by weight per 100 parts by weight of said hydrophobic core material.

2. Process according to claim 1, wherein said amino resin is urea/aldehyde polycondensate.

3. Process according to claim 2, wherein said urea-/aldehyde polycondensate is urea/formaldehyde.

4. Process according to claim 1, wherein said amino resin is melamine/aldehyde polycondensate.

5. Process according to claim 1, wherein said anionic, water-soluble copolymer comprises at least one monomer selected from the group consisting of alkylacrylate, methacrylic acid, alkyl methacrylate, acrylamide, methacrylamide, succinic ester of hydroxyalkyl acrylate, succinic ester of hydroxyalkyl methacrylate, vinylacetate and acrylonitrile as fourth and further components in addition to said three monomers including acrylic acid, hydroxyalkylacrylate or hydroxyalkylmethacrylate and styrenesulfonic acid.

6. Process according to claim 1 or 5, wherein said anionic, wate-soluble copolymer comprises more than 50% by weight of acrylic acid.

7. Process according to claim 1 or 5, wherein said anionic, water-soluble copolymer comprises 10–95% by weight of acrylic acid, 2–50% by weight of styrenesulfonic acid, 2–30% by weight of hydroxyalkyl acrylate or hydroxyalkyl methacrylate, and 0–20% by weight of said fourth and further components.

8. Processing according to claim 7, wherein the hydroxyalkyl group of said hydroxymethacrylate includes 1–4 carbon atoms.

9. Process according to claim 7, wherein hydroxyalkyl group of said hydroxyalkyl acrylate includes 1–4 carbon atoms.

10. Process according to claim 1 or 5, wherein said anionic, water-soluble copolymer comprises 50–80% by weight of acrylic acid, 5–30% by weight of styrenesulfonic acid, 5–20% by weight of hydroxyalkyl acrylate or hydroxyalkyl methacrylate, and 1–15% by weight of said fourth and further components.

11. Process according to claim 10, wherein the hydroxyalkyl group of said hydroxymethacrylate includes 1-4 carbon atoms.

12. Process according to claim 10, wherein hydroxyalkyl group of said hydroxyalkyl acrylate includes 1-4 carbon atoms.

13. Process according to claim 1 or 5, wherein the hydroxyalkyl group of said hydroxyalkylmethacrylate includes 1-4 carbon atoms.

14. Process according to claim 1 or 5, wherein the hydroxyalkyl group of said hydroxyalkyl acrylate includes 1-4 carbon atoms.

15. Process according to claim 1 or 5, wherein said amino resin is at least one substance selected from a group consisting of methylurea/aldehyde polycondensate, dimethylolurea/aldehyde polycondensate, methyldimethylolurea/aldehyde polycondensate, melamine/aldehyde polycondensate, methylated melamine/aldehyde polycondensate, butylated melamine/aldehyde polycondensate and melamine/aldehyde polycondensate modified withphenols, benzoguanamine or urea.

* * * * *